(12) United States Patent
Morris et al.

(10) Patent No.: US 11,897,065 B2
(45) Date of Patent: Feb. 13, 2024

(54) COMPOSITE TURBINE DISC ROTOR FOR TURBOMACHINE (71) Applicant: HONEYWELL INTERNATIONAL INC., Morris Plains, NJ (US)

(72) Inventors: Mark Morris, Phoenix, AZ (US); Paul Kurlak, Scottsdale, AZ (US); Stuart Harman, Peoria, AZ (US); Daira Legzdina, Phoenix, AZ (US); Jason Smoke, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 576 days.

(21) Appl. No.: 16/777,343

(22) Filed: Jan. 30, 2020

(65) Prior Publication Data
US 2021/0140318 A1 May 13, 2021

Related U.S. Application Data (60) Provisional application No. 62/934,173, filed on Nov. 12, 2019.

(51) Int. Cl.
*B23P 15/06* (2006.01)
*F01D 5/30* (2006.01)
*B23P 15/00* (2006.01)
*B23K 101/00* (2006.01)

(52) U.S. Cl.
CPC .......... *B23P 15/006* (2013.01); *F01D 5/3007* (2013.01); *B23K 2101/001* (2018.08); *F05D 2230/239* (2013.01); *F05D 2230/60* (2013.01)

(58) Field of Classification Search
CPC ........ B23P 15/006; F01D 5/3007; F01D 5/28; F01D 5/34; B23K 2101/001; B23K 20/02; B23K 20/1205; F05D 2230/239; F05D 2230/60; F05D 2230/80; F05D 2300/175; F05D 2300/176; Y02T 50/60
See application file for complete search history.

(56) References Cited

U.S. PATENT DOCUMENTS 5,113,583 A * 5/1992 Jenkel ................... F01D 5/3061
29/889
5,735,046 A 4/1998 Frasier et al.
5,836,742 A 11/1998 Dierksmeier et al.
(Continued)

FOREIGN PATENT DOCUMENTS

EP 0503697 B1 6/1995

OTHER PUBLICATIONS

Caron, P. and T. Khan, "Evolution of Ni-Based Superalloys for Single Crystal Gas Turbine Blade Applications," Dec. 1, 1999.

*Primary Examiner* — Ryan J. Walters
(74) *Attorney, Agent, or Firm* — LORENZ & KOPF, LLP (57) ABSTRACT A rotor for a turbomachine and a method of manufacturing the same. The method includes providing a lug with a lug body and an interface material disposed on the lug body. The method also includes friction welding the lug to a hub member via the interface material to define a projected structure for an outer radial area of a disc assembly of the rotor. The projected structure is configured to support a first side of a rotor blade of the rotor in cooperation with a second projected structure of the disc assembly supporting a second side of the rotor blade. The lug body and the hub member are made from different materials.

18 Claims, 9 Drawing Sheets (56) References Cited

U.S. PATENT DOCUMENTS

| | | | |
|---|---|---|---|
| 5,865,364 A | 2/1999 | Trask et al. | |
| 7,731,075 B2 | 6/2010 | Bray | |
| 8,449,262 B2 | 5/2013 | Strangman | |
| 8,882,442 B2 | 11/2014 | Smarsly et al. | |
| 8,918,996 B2 | 12/2014 | Wessman et al. | |
| 9,114,480 B2 | 8/2015 | Knott et al. | |
| 9,938,831 B2 * | 4/2018 | Suciu | F01D 5/026 |
| 9,938,834 B2 | 4/2018 | Blumer et al. | |
| 9,951,632 B2 | 4/2018 | Waldman et al. | |
| 10,119,408 B2 | 11/2018 | Richter | |
| 10,384,302 B2 | 8/2019 | March | |
| 2004/0005219 A1 | 1/2004 | Phipps | |
| 2010/0284817 A1 * | 11/2010 | Bamberg | F01D 5/3061 29/889.7 |
| 2011/0129347 A1 | 6/2011 | Schneefeld et al. | |
| 2017/0022827 A1 | 1/2017 | Waldman et al. | |
| 2018/0209280 A1 * | 7/2018 | Forsdike | B23K 20/16 |
| 2018/0209281 A1 | 7/2018 | Boswell et al. | |
| 2019/0076970 A1 | 3/2019 | Machinchick et al. | |
| 2019/0184489 A1 | 6/2019 | Ulrichsohn et al. | |
| 2019/0345831 A1 | 11/2019 | Freeman et al. | |

* cited by examiner

COMPOSITE TURBINE DISC ROTOR FOR TURBOMACHINE

CROSS-REFERENCE TO RELATED APPLICATION

This application claims the benefit of U.S. Provisional Application No. 62/934,173, filed on Nov. 12, 2019, the entire disclosure of which is incorporated herein by reference.

TECHNICAL FIELD

The present disclosure generally relates to a rotor for a turbomachine and, more particularly, relates to a composite turbine disc rotor for a turbomachine.

BACKGROUND

Turbomachines, such as gas turbine engines are often used in aircraft and other applications. For example, gas turbine engines used as aircraft main engines may provide propulsion for the aircraft but are also used to provide power generation. It is desirable for such systems to deliver high performance in a compact, lightweight configuration.

Turbine rotors of a gas turbine engine may include a disc and a plurality of blades radiating therefrom. In some embodiments, the disc and blades may be formed independently and then subsequently attached together. These turbines may be subjected to various types of loading. They can experience low cycle fatigue (LCF), for example, at the disc-to-blade attachment. High stresses on the disc may result from the high centrifugal loads imparted by the turbine blades. In high efficiency engines, there may be elevated compressor discharge temperatures and, thus, an increase in turbine disc rim temperatures. The combination of high stresses and high temperatures can limit the operating life of the rotor.

Manufacturing turbine rotors also presents various disadvantages. For example, the manufacturing methods and/or the tooling involved may be highly complex, energy intensive, and otherwise inefficient. Repairing the turbine rotor may be highly inconvenient, time consuming, and/or costly as well.

Accordingly, it is desirable to provide a stronger and more robust turbine rotor, which can withstand exposure to higher operating temperatures. In addition, it is desirable to provide manufacturing methods for making, maintaining, and/or repairing such turbine rotors. Furthermore, other desirable features and characteristics of the present disclosure will become apparent from the subsequent detailed description and the appended claims, taken in conjunction with the accompanying drawings and this background section.

SUMMARY

In one embodiment, a method of manufacturing a rotor for a turbomachine is disclosed. The method includes providing a lug with a lug body and an interface material disposed on the lug body. The method also includes friction welding the lug to a hub member via the interface material to define a projected structure for an outer radial area of a disc assembly of the rotor. The projected structure is configured to support a first side of a rotor blade of the rotor in cooperation with a second projected structure of the disc assembly supporting a second side of the rotor blade. The lug body and the hub member are made from different materials.

In another embodiment, a disc assembly for a rotor of a turbomachine is disclosed. The disc assembly includes a hub and a plurality of lugs that are attached to the hub. The plurality of lugs project radially from the hub and are spaced apart in a circumferential direction to define a blade space for a rotor blade of the rotor. At least one of the plurality of lugs is metallurgically bonded to a hub member of the hub to define a respective projected structure of the disc assembly. Also, this lug includes a lug body and an interface material that is metallurgically bonded to the lug body at a first bond interface. The interface material is welded to the hub member at a weld joint. The first bond interface is disposed outboard radially of the weld joint. The lug body and the hub member are made from different materials.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Generally, an improved turbine rotor for a turbomachine (e.g., a gas turbine engine) is disclosed. The rotor may include a disc assembly with a hub and a plurality of lugs that are attached on an outer diameter of the hub. The lugs may radiate from the hub and may be spaced apart circumferentially about a longitudinal axis of the rotor. The lugs and hub may cooperatively support turbine blades, which are arranged circumferentially about the disc assembly. The blades may thus, in some embodiments, be removably attached to the disc assembly, which facilitates manufacture, maintenance, and repair of the turbine rotor. Also, the disc assembly may be considered a composite structure in that it may be assembled from multiple parts (i.e., the hub and the attached lugs).

At least one lug and the hub member to which it is attached may be formed from different materials. The hub member and lug(s) may be made of different alloys of material. Thus, the disc assembly may be a plural alloy disc assembly (e.g., a dual alloy disc assembly). Furthermore, in some embodiments, at least one lug may include a plurality of components. At least one component may facilitate attachment of the lug to the hub member. Another component may provide high-temperature performance for the lug. Accordingly, the disc assembly may be included in a high-efficiency rotor for a turbomachine, such as a gas turbine engine.

In some embodiments, at least one lug may include a first portion. The first portion may define a majority of the lug and may be referred to as a lug body. The first portion may be formed from a single crystal material having primary and secondary grain orientation. In other embodiments, the first portion of the lug may be formed from a high-temperature polycrystalline material (e.g., a nickel-based super alloy such as Mar-M-247EA equiaxed or Mar-M-247DS directionally solidified).

The lug(s) may also include a second portion. The second portion may be metallurgically bonded to the first portion. The second portion may be solid-state diffusion bonded to the first portion in some embodiments. The second portion may form a relatively thin layer over the first portion. The material characteristics of the second portion may be suited for bonding the first portion of the lug to the hub member.

Thus, in some embodiments, the second portion may be bonded as an interface layer on the first portion of the lug. Then, the lug may be frictionally bonded (e.g., linear friction welded) to the hub member via the second portion. Once attached, the lug and/or hub member may be shaped (e.g., machined) to further form a blade space that will ultimately receive a turbine blade of the rotor. In some embodiments, the turbine blades may be single crystal or polycrystalline turbine blades, and they may be removably attached between neighboring pairs of the lugs and also supported by the hub. Further manufacturing processes may be employed for finishing the rotor and installing it within a turbine section of the gas turbine engine. Accordingly, the present disclosure provides efficient manufacturing methods used to provide highly robust turbine disc assemblies for use in high efficiency gas turbine engines.

Moreover, the hub member may be made (e.g., cast, wrought, forged, or extruded and isoforged) from powder metal material in some embodiments. By contrast, the lug bodies (the first portion of the lugs) may made from single crystal material. In some embodiments, single crystal lugs may be welded to a superalloy disc hub so that single-crystal structures form the outermost radial portions (i.e., the rim) of the disc assembly. Thus, this outer rim may have high-temperature capability. Furthermore, manufacturing efficiencies are provided by the present disclosure. Also, the present disclosure provides improved opportunity for inspection of the weld integrity between the lugs and the hub and enables repair/replacement of individual attachments/lugs if needed. Likewise, individual blades may be removably attached to the disc assembly; therefore, the blades may be conveniently attached, removed, and replaced as will be discussed.

Figure 1:
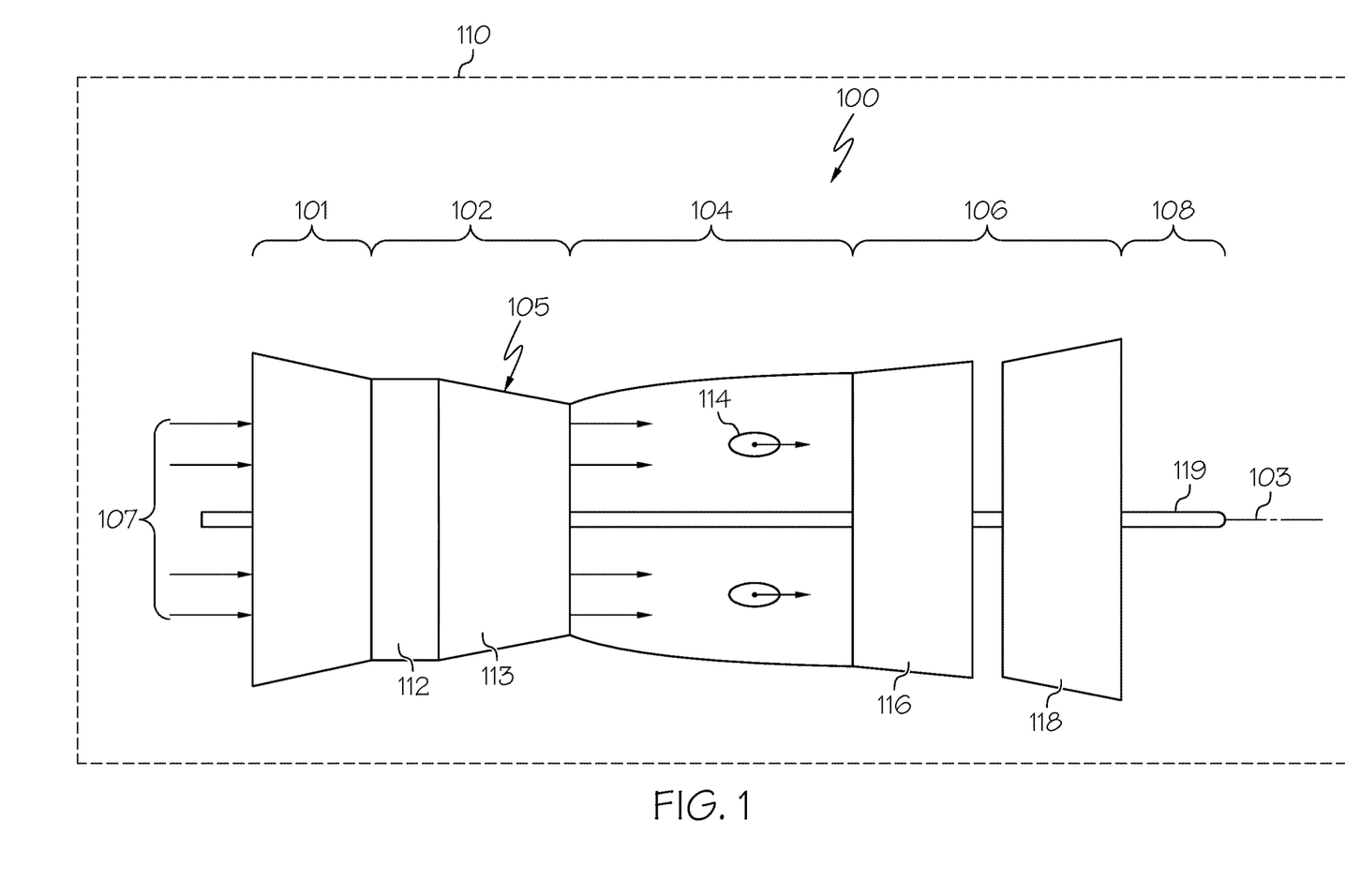
FIG. 1 is a schematic view of a gas turbine engine according to example embodiments of the present disclosure.

FIG. 1 shows a functional block diagram of an exemplary turbomachine 100 of the present disclosure. The turbomachine may be a gas turbine engine 105 as shown. The engine 105 may be included on a vehicle 110 of any suitable type, such as an aircraft, rotorcraft, marine vessel, train, or other vehicle, and the engine 105 can propel or provide auxiliary power to the vehicle 110. In some embodiments, the vehicle 110 may be a single-spool turbo-shaft gas turbine propulsion engine; however, the exemplary embodiments discussed herein are not intended to be limited to this type, but rather may be readily adapted for use in other types of turbine engines including but not limited to two-spool engines, three-spool engines, turbofan and turboprop engines or other turbomachines. The engine 105 may also be used in numerous non-vehicular environments where a source of rotational power may be needed.

The engine 105 may generally include an intake section 101, a compressor section 102, a combustion section 104, a turbine section 106, and an exhaust section 108, which may be arranged in sequence along a longitudinal axis 103. A downstream direction through the engine 105 may be defined generally along the axis 103 from the intake section 101 to the exhaust section 108. Conversely, an upstream direction is defined from the exhaust section 108 to the intake section 101.

The intake section 101 may receive an intake airstream indicated by arrows 107 in FIG. 1. The compressor section 102, may include one or more compressor stages that draw air 107 downstream into the engine 105 and compress the air 107 to raise its pressure. In the depicted embodiment, the compressor section 102 includes two stages: a low-pressure compressor stage 112 and a high-pressure compressor stage 113. The compressor stages 112, 113 may be disposed sequentially along the axis 103 with the low-pressure compressor stage 112 disposed upstream of the high-pressure compressor stage 113. It will be appreciated that the engine 105 could be configured with more or less than this number of compressor stages.

The compressed air from the compressor section 102 may be directed into the combustion section 104. In the combustion section 104, which includes a combustor assembly 114, the compressed air is mixed with fuel supplied from a non-illustrated fuel source. The fuel-and-air mixture is combusted in the combustion section 104, and the high energy combusted air mixture is then directed into the turbine section 106.

The turbine section 106 includes one or more turbine stages. In the depicted embodiment, the turbine section 106 includes two turbine stages: a high-pressure turbine stage 116 and a low-pressure turbine stage 118. However, it will be appreciated that the engine 105 could be configured with more or less than this number of turbine stages. No matter the particular number, the combusted air mixture from the combustion section 104 expands through each turbine stage 116, 118, causing it to rotate at least one shaft 119. The combusted air mixture is then exhausted via the exhaust section 108. The power shaft 119 may be used to drive various devices within the engine 105 and/or within the vehicle 110.

Figure 2:
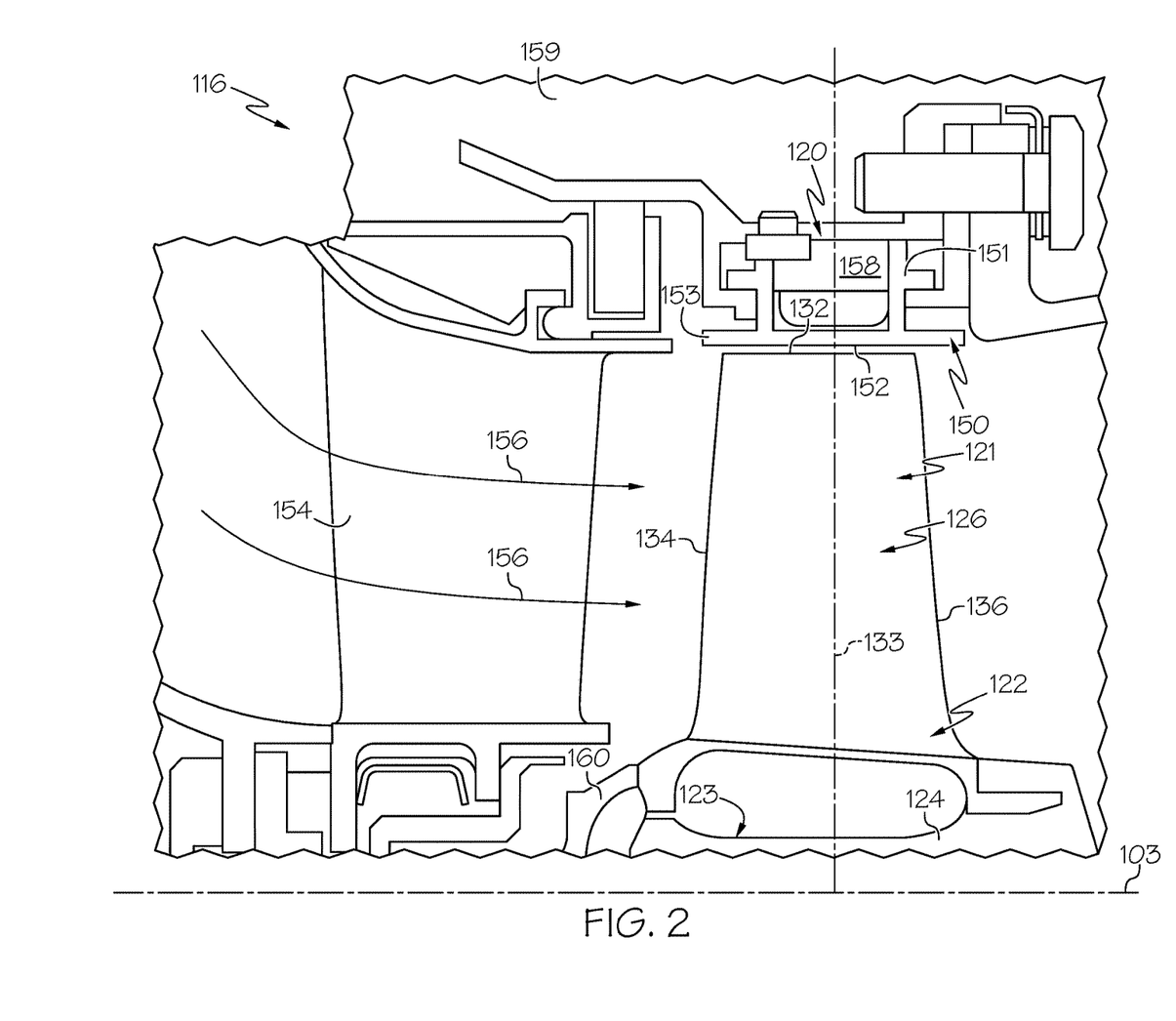
FIG. 2 is a longitudinal cross-sectional view of a turbine stage with a rotor of the gas turbine engine of FIG. 1 according to example embodiments.

Referring now to FIG. 2, a portion of the engine 105 that includes the turbine section 106 will be discussed in greater detail according to example embodiments of the present disclosure. Specifically, areas of the high-pressure turbine stage 116 is shown as an example and may include features of the present disclosure; however, it will be appreciated that the features described may be included in the low-pressure turbine stage 118 or another area of a turbomachine without departing from the scope of the present disclosure.

The turbine stage 116 may include a shroud support structure 120 (i.e., shroud case). The shroud support structure 120 may include one or more rigid braces, brackets, struts, and/or other structures. The shroud support structure 120 may extend about the axis 103. (The axis 103 is shown for reference purposes in FIG. 2. It will be understood that the axis 103 shown in FIG. 2 is out-of-position to fit onto the page and that the axis 103 actually extends through the center of the turbine stage 116 as represented in FIG. 1.)

The turbine stage 116 may also include a shroud 150. Generally, the shroud 150 may be a hollow, cylindrical structure with an outer side 151 facing away from the axis 103 and an inner side 153 facing the axis 103. The shroud 150 may be substantially centered about the axis 103. The outer side 151 may be fixedly attached to the shroud support structure 120 via a plurality of fasteners, etc. The inner side 153 defines a shroud surface 152 (i.e., an inner diameter surface of the shroud 150). In some embodiments, the shroud surface 152 may be substantially cylindrical (e.g., the shroud surface 152 may resemble a right circular cylinder). In additional embodiments of the present disclosure, the shroud surface 152 may be frustoconic in shape and tapered with respect to the axis 103 so as to change in width with respect to different positions on the longitudinal axis. Moreover, in some embodiments, the shroud 150 may include a plurality of arcuate segments that are arranged end-to-end about the axis 103 and fixed to the shroud support structure 120 to cooperatively define the shroud 150 and the shroud surface 152.

A turbine stator member 154 may be fixed to and supported by the shroud support structure 120. The turbine stator member 154 may have an airfoil surface profile and may be disposed upstream of the shroud 150. The turbine stator member 154 may direct a fluid flow (a hot gas flow) generally along the axis 103 in the downstream direction as indicated by arrows 156.

Moreover, a cooling fluid passage 158 may be defined between the outer side 151 of the shroud 150 and the shroud support structure 120. The cooling fluid passage 158 may extend in one or more directions (e.g., arcuately about the axis 103) and may be in fluid communication with a compressor plenum 159. The cooling fluid passage 158 may receive a flow of cooling air from the plenum 159 for removing heat from the turbine stage 116.

Additionally, the turbine stage 116 may include a rotor 121, which includes a turbine wheel 122 that is supported on the shaft 119 (FIG. 1). The turbine wheel 122 and shaft 119 may be supported for rotation as a unit about the axis 103.

The turbine wheel 122 may include a disc assembly 124 that is centered on the axis 103. The shaft 119 may extend through the disc assembly 124 and may be fixedly attached thereto. The turbine wheel 122 may further include a plurality of blades 126, which are fixedly attached to the disc assembly 124, and which extend radially from the disc assembly 124. The blades 126 may radiate from the disc assembly 124 and may be spaced substantially equally about the axis 103 in the circumferential direction. The turbine wheel 122 may be mounted within the shroud 150 for rotation therein. As such, the plurality of blades 126 of the turbine wheel 122 may radially oppose the shroud surface 152. The hot gas flow 156 may push against the blades 126 and drive the rotor 121 in rotation about the axis 103 (i.e., the axis of rotation).

Figure 3:
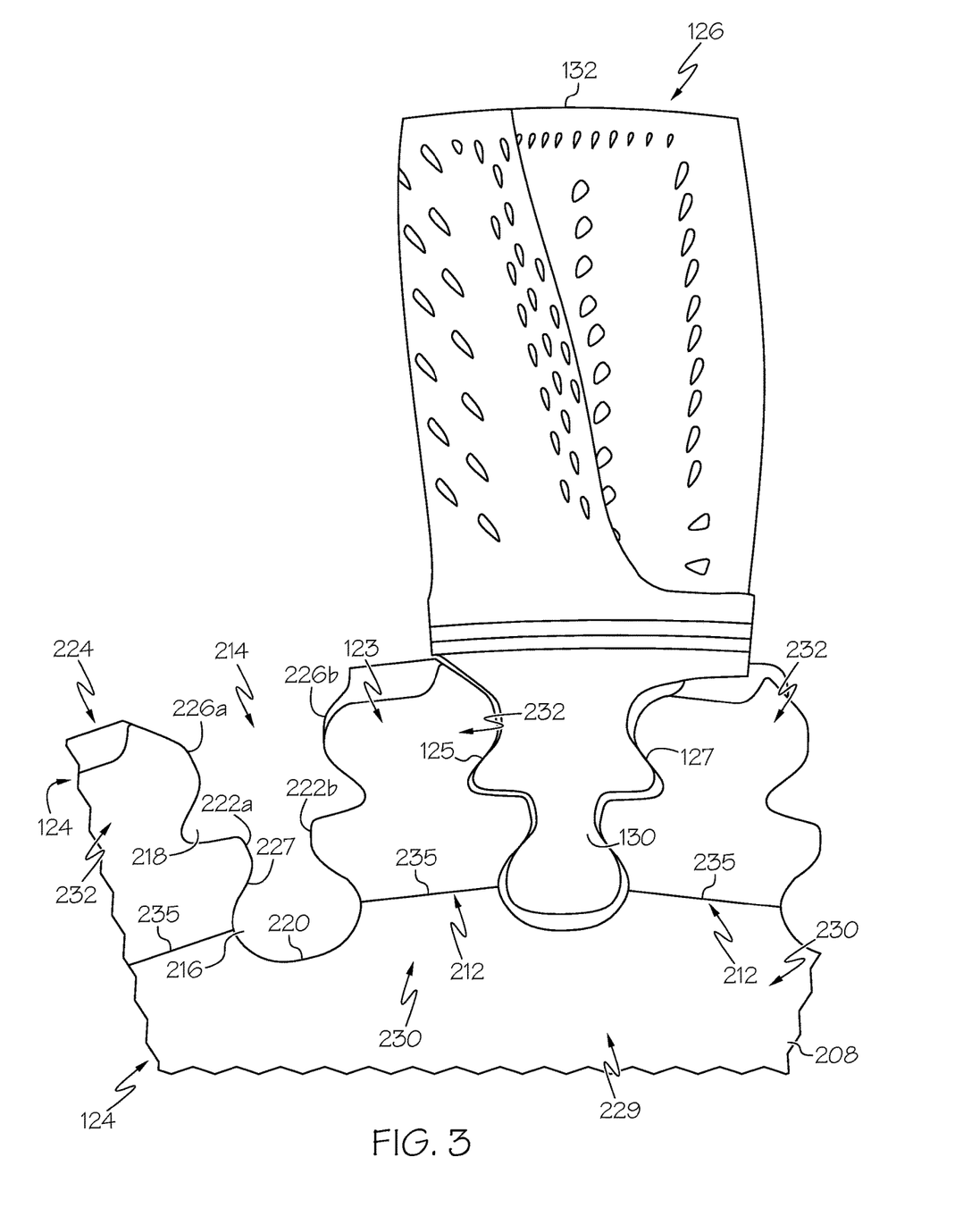
FIG. 3 is an end view of an outer radial area of a disc assembly of the rotor of FIG. 2 and a rotor blade supported thereon.

FIGS. 2 and 3 include a representative one of the plurality of blades 126. The blades 126 may exhibit a respective airfoil-shaped profile with complex, three-dimensional curved surfaces. The blades 126 may also include one or more passages therein, for example, to accommodate a flow of internal cooling fluid therethrough. As shown, the blade 126 includes a respective inner radial end 130 (FIG. 3) that is fixedly attached to an outer radial area 123 of the disc assembly 124. The blade 126 radially terminates at an outer radial edge or blade tip 132. The blade tip 132 is radially spaced apart from the inner radial end 130 along a respective radial axis 133 of the blade 126. The blade tip 132 is oriented toward the surface 152 of the shroud 150. The blade 126 further includes a leading edge 134, which extends radially between the inner radial end 130 and the blade tip 132. Furthermore, the blade 126 includes a trailing edge 136, which extends radially between the inner radial end 130 and the blade tip 132. The trailing edge 136 may be spaced downstream of the leading edge 134. The blade tip 132 extends between the leading edge 134 and the trailing edge 136.

FIG. 3 shows a portion of the disc assembly 124 with a single blade 126 shown supported thereon. As shown, a first side 125 of the inner radial end 130 and an opposing second side 127 of the inner radial end 130 may be supported by projected structures 212 of the outer radial area 123. Also as shown in FIG. 2, the inner radial end 130 may be retained in an axial position relative to the disc assembly 124 by one or more seal plates 160. FIG. 2 shows a seal plate 160 at the forward side of the blade 126, and it will be appreciated that a seal plate 160 may be provided at the aft side of the blade 126 in some embodiments. The blades 126 of the rotor 121 may be removably attached to the disc assembly 124, and the disc assembly 124 may support the rotor blades 126 as the rotor 121 rotates about the axis 103.

Figure 4:
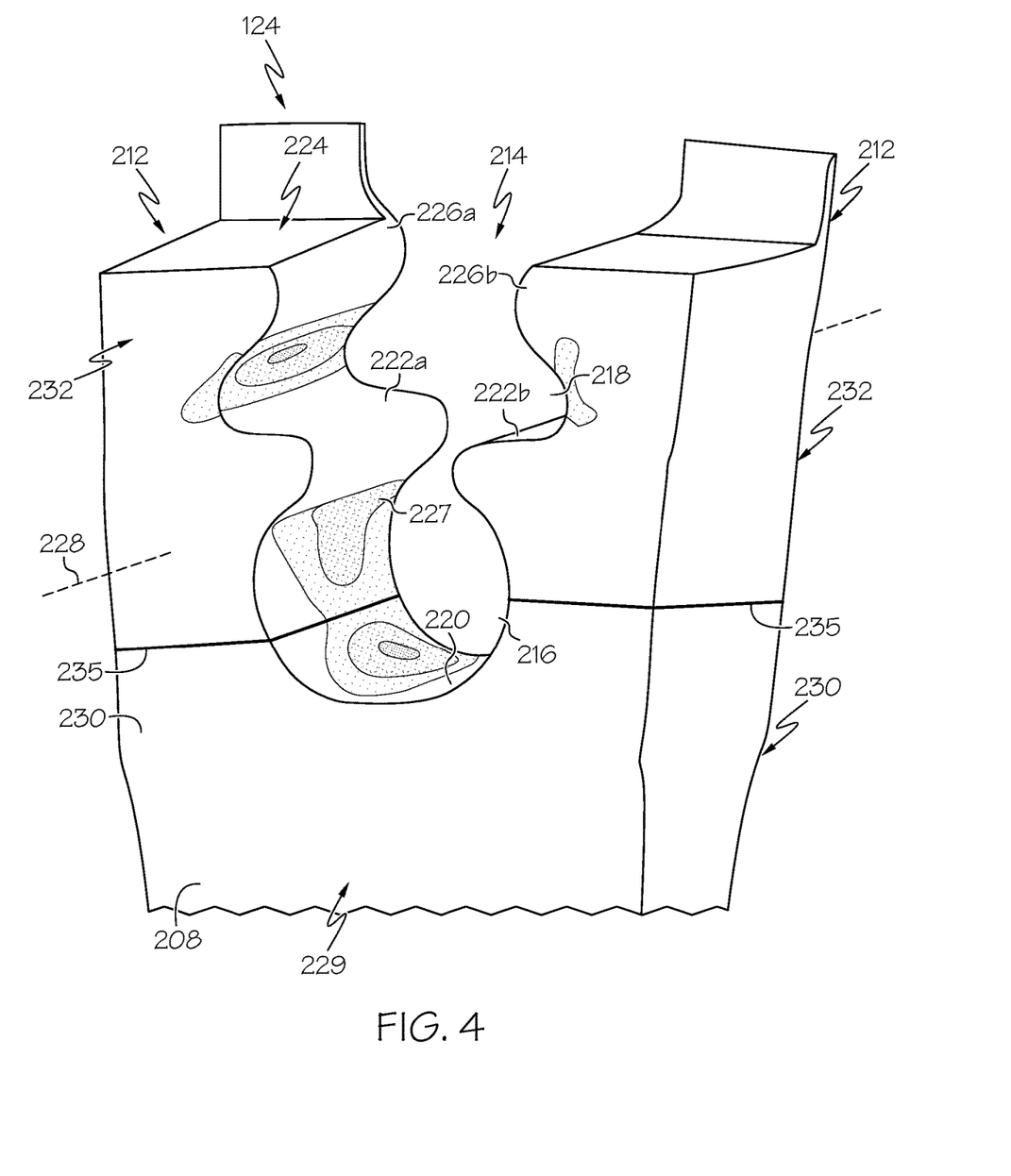
FIG. 4 is a perspective view of the disc assembly of FIG. 3, wherein a stress distribution across the disc assembly is mapped thereon according to example embodiments.

Other blades in FIG. 3 are hidden for clarity and to illustrate the disc assembly 124 in better detail. FIG. 4 illustrates a corresponding portion of the disc assembly 124 of the turbine wheel 122 in isolation (i.e., with the blades 126 hidden for clarity). As shown, the disc assembly 124 may include an annular base 208. The base 208 may be centered about the longitudinal axis 103. Also, the disc assembly 124 may include the plurality of projected structures 212 (i.e., disc posts, radial supports, etc.). The projected structures 212 may project radially from the annular base 208. Also, the projected structures 212 may be spaced apart equally about the annular base 208 in the circumferential direction relative to the axis 103. Accordingly, the disc assembly 124 may include a plurality of intermediate spaces 214 (slots, gaps, channels, etc.) between neighboring pairs of the projected structures 212. The spaces 214 may have a variety of shapes, dimensions, etc. The shape/dimension/size may be uniform for each of the spaces 214. For example, the spaces 214 may be generally tree-shaped (e.g., shaped substantially like a fir tree). The spaces 214 may be shaped for receiving respective rotor blades 126.

In some embodiments, the space 214 may include an inner lobe 216 and an outer lobe 218. The inner lobe 216 may be rounded (arcuate) and may include an intermediate slot bottom surface 220. The intermediate slot bottom surface 220 may face outward radially from the axis 103 and may separate neighboring pairs of the projected structures 212 in the circumferential direction. The inner lobe 216 may be separated from the outer lobe 218 radially by opposing lower tangential projections 222a, 222b (lower branches) of the projected structures 212. The outer lobe 218 may be open at a disc rim 224 (i.e., outer diameter) of the disc assembly 124. Also, the outer lobe 218 of the space 214 may be defined by opposing upper tangential projections 226a, 226b (upper branches) of the projected structures 212 proximate the disc rim 224.

The spaces 214 may be configured as slots that are elongated substantially in the longitudinal direction (along the axis 103). The spaces 214 may include a respective longitudinal axis 228 (FIG. 4). The axis 228 may be substantially straight and linear and directed substantially in the longitudinal direction. In some embodiments, the axis 228 may be substantially parallel (within +/−2 degrees) to parallel with the longitudinal axis 103 of the rotor 121.

Referring to FIG. 3, the rotor blades 126 may be removably received within respective ones of the intermediate spaces 214 and fixed therein to the disc assembly 124. The inner radial end 130 of the blade 126 may have a shape negatively corresponding to the shape of the respective space 214 to fit snugly therein. Specifically, the inner radial end 130 may be bulbous so as to fit snugly within the inner lobe 216, and further outward radially, the blade 126 may include rounded projections (flanges, rails, etc.) that project outward tangentially to be received in respective outer lobes 218 of the spaces 214. Further outward in the radial direction, the blade 126 may have concave curvature that corresponds to the convex curvature of the respective space 214. As mentioned above and shown in FIG. 2, one or more seal plates 160 may retain the blade 126 to the disc assembly 124. The seal plate 160 may be removed from the disc assembly 124 for removal and replacement of the blade 126 as well. Thus, the blades 126 of the rotor 121 may be removably attached to the disc assembly 124.

In some embodiments, the rotor blades 126 may be formed from a single crystal metallic material, such as a nickel-based superalloy. The blades 126 may alternatively be formed from a high-temperature capable polycrystalline nickel-based super alloy such as Mar-M-247EA equiaxed or Mar-M-247DS directionally solidified. Once formed, the rotor blades 126 may be inserted into the spaces 214 of the disc assembly 124 and the seal plate(s) 160 may be installed for retaining the blades 126 on the disc assembly 124.

Different areas of the disc assembly 124 may be subjected to different levels of stress during rotation of the rotor 121. An exemplary load pattern is mapped onto the disc assembly 124 in FIG. 4 with more heavily stippled areas indicating areas of higher stress concentration and less stippled areas indicating lower stress concentrations. Areas that are not stippled indicate areas that are subject to the lowest load levels. As shown, areas of the slot bottom surface 220 and an inwardly facing lower fillet surface 227 of the lower lobe 216 may be subject to higher stress concentrations than other areas of the disc assembly 124.

In some embodiments, the projected structures 212 may be cooperatively defined by a hub member 230 and a plurality of lugs 232 metallurgically bonded thereto. In some embodiments, the hub members 230 may be integrally attached to define a unitary, one-piece hub 229 of the disc assembly 124, and each hub member 230 may include an attached lug 232. In some embodiments, the hub member 230 may define portions of the annular base 208. Also, the hub member 230 may define part of the projected structure 212 with the lug 232 defining the remainder. The lugs 232 may define the majority of the respective projected structures 212. Two neighboring lugs 232 and the respective hub members 230 may cooperate to define a respective one of the spaces 214 therebetween. The lugs 232 may be fixedly attached and bonded to the hub member 230, for example, via respective weld joints 235. As will be discussed, the lugs 232 may be frictionally welded (e.g., linear friction welded) to the respective hub member 230 to form the weld joints 235.

Collectively, the plurality of lugs 232 may define the majority of the disc rim 224 of the disc assembly 124. The lugs 232 may be configured with one or more materials with properties that provide the disc rim 224 with high strength and robustness, even at high temperature operating conditions. For example, a majority of the lugs 232 may be made from single crystal material in some embodiments. The lugs 232 may also be configured with one or more materials that facilitate attachment to the hub member 230. For example, areas of the lugs 232 may be made from a material that is the same or substantially similar to the material of the hub member 230. In additional embodiments, the lugs 232 and the hub member 230 may be made of different materials, but areas of the lugs 232 and the hub member 230 may have complimentary material characteristics (e.g., yield strength, etc.) for facilitating a friction welding attachment process.

Figure 5:
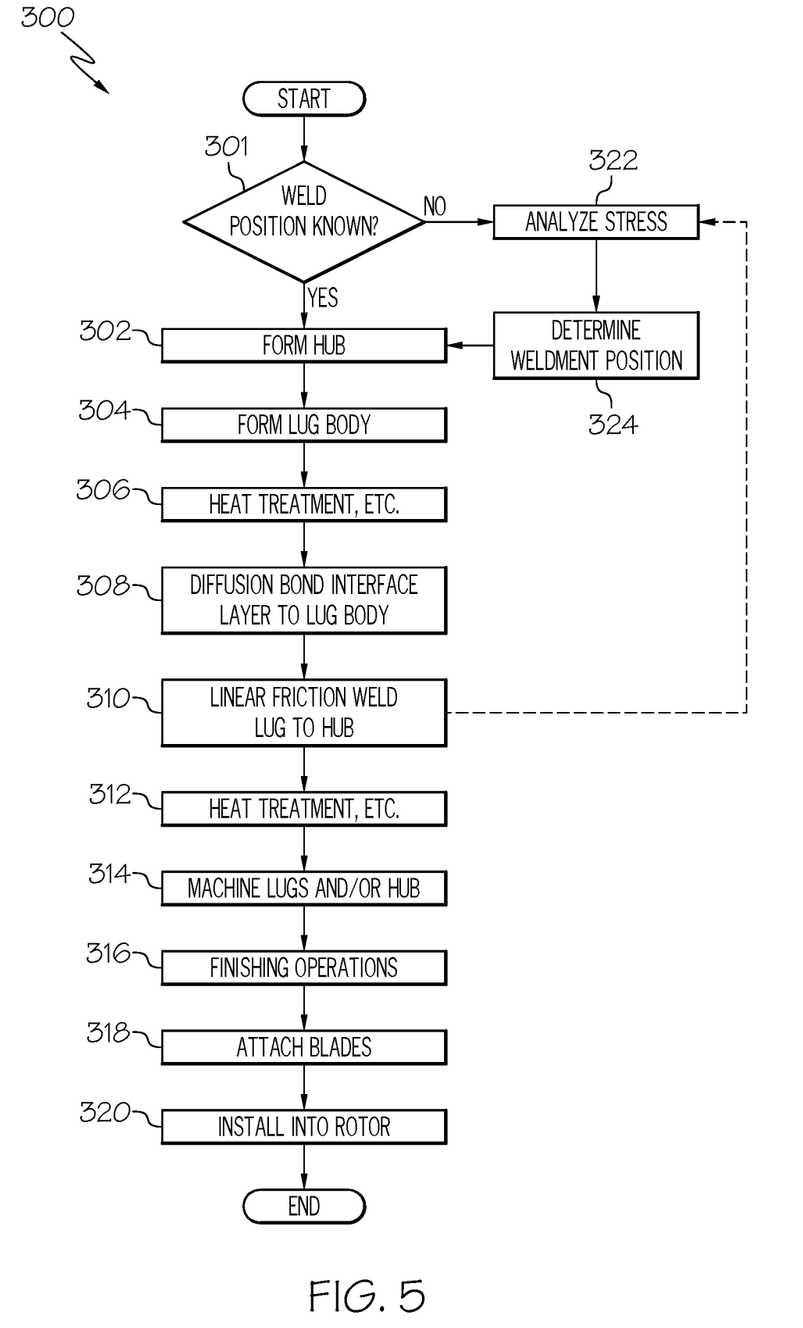
FIG. 5 is a flowchart illustrating a method of manufacturing the rotor of the present disclosure according to example embodiments.

Referring now to FIG. 5, a method of manufacturing 300 the turbine wheel 122 will be discussed according to example embodiments. The method 300 may be employed during development and design of the turbine wheel 122 as will be discussed. The method 300 may also be employed for high volume, repeatable, and/or automation-assisted manufacture of the turbine wheel 122.

The method 300 may vary at 301 depending on whether a location of the weld joint 235 (e.g., a radial distance of the mating surfaces relative to the axis 103) is known or not. The location of the weld joint 235 may be unknown during a development and design process of the turbine wheel 122. Initially, it will be assumed that the location of the weld joint is known (i.e., 301 answered affirmatively).

Thus, at 302 of the method 300, the hub 229 may be formed. The hub 229 may be formed to resemble the version of the hub 229 shown in FIG. 6 (i.e., a unitary, one-piece hub 229 that includes the plurality of hub members 230. The hub 229 may be made from a nickel-based superalloy or other suitable material in some embodiments. The hub 229 may be formed from Alloy 10 in some embodiments. The hub 229 may be formed, for example, via a powder metal forging process. In some embodiments of 302 of the method 300, the hub 229 may be formed substantially into an annular disc shape, and then material may be removed from the outer diameter in a machining process to shape and define various features of the hub members 230. For example, the hub members 230 may include respective mate surfaces 234 that are shaped via a material removal process (e.g., Electro-Discharge Machining or other machining of the powder metal-forged annular part). The individual mate surfaces 234 may be smooth, planar, and/or rectangular in some embodiments. The mate surfaces 234 may be oriented parallel to the axis 103 and tangential thereto. Neighboring pairs of the mate surfaces 234 may be separated in the circumferential direction by respective slots 236. In additional embodiments of 302 of the method 300, the hub 229 may be formed via a rapid manufacturing process to form the annular base 208, the mate surfaces 234, and the slots 236. The rapid manufacturing process may be an additive manufacturing process (e.g., 3-D printing process) or other rapid manufacturing process (e.g., metal stereographic lithography (MSL), binder jet printing, selective laser melting; direct metal deposition; direct metal laser sintering (DMLS); direct metal laser melting; electron beam melting; electron beam wire melting; micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; laser engineered net shaping; Direct Metal Electron Beam Fusion (DMEBF)).

Figure 6:
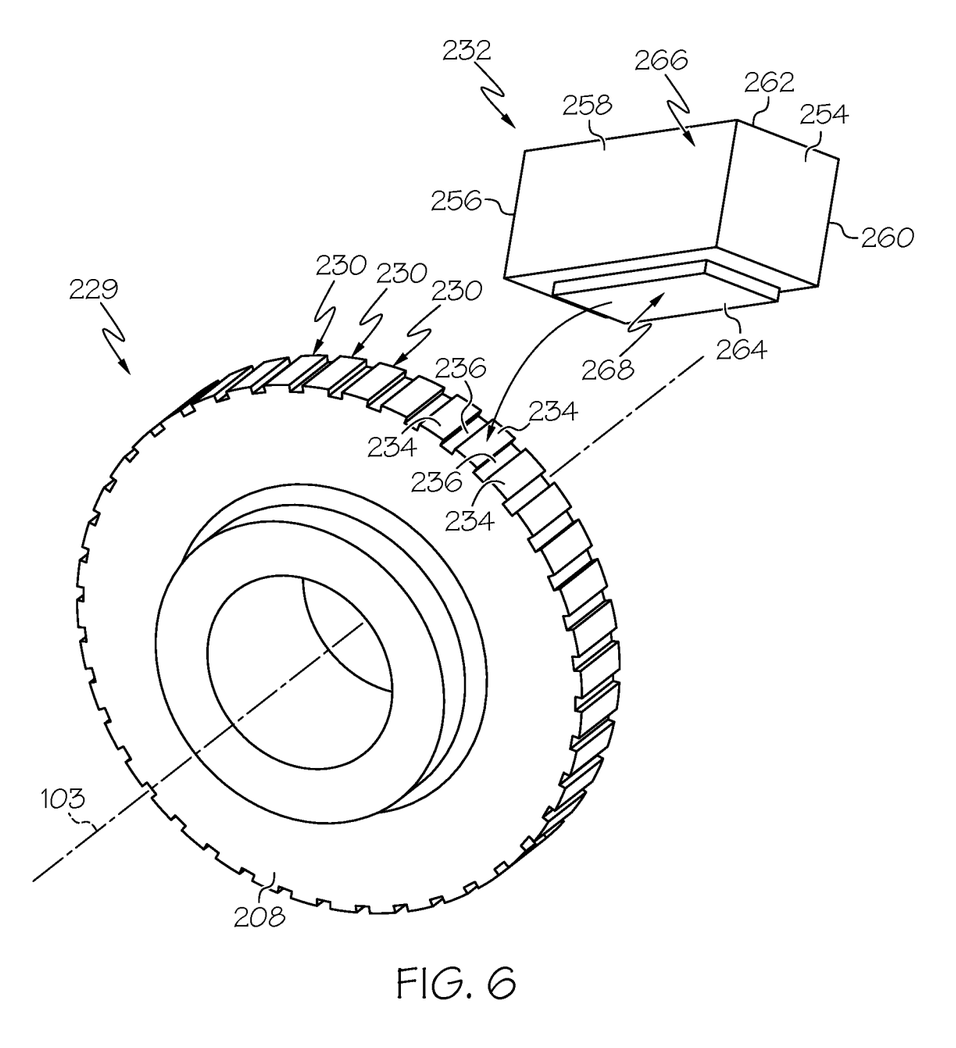
FIG. 6 is a perspective and partly schematic view of a hub and a lug schematically formed according to the method of FIG. 5.

Furthermore, as illustrated in the embodiments of FIG. 6, the method 300 may include forming the lugs 232. The lugs 232 may be formed in one or more processes indicated at 304-308 of the method 300 of FIG. 5. Although the lugs 232 are shown as being formed subsequent to the formation of the hub 229 in FIG. 5, it will be appreciated that the lugs 232 may be formed before the hub 229. Also, the lugs 232 may be formed coincidentally with the manufacture of the hub 229.

As shown in FIG. 6, at least one lug 232 may be initially formed as a block (preform member) that is generally cuboid with a forward end 254, an aft end 256, a first side surface 258, a second side surface 260, an outer radial side 262, and an inner radial side 264. Each of these sides may be substantially smooth. They also may be flat and planar in some embodiments.

The lug 232 may generally include a lug body 266 and an interface material 268 (i.e., a compliant layer, attachment layer, etc.). The lug body 266 may be a solid, rigid member that defines the forward end 254, aft end 256, first side surface 258, second side surface 260, and outer radial side 262 of the lug 232. The interface material 268 may be a thin member that is fixedly attached and layered on the lug body 266 to define a majority of the inner radial side 264. The interface material 268 may initially have a smaller or larger area than the lug body 266, and the interface material 268 and the inner radial side 264 may be centered under the lug body 266.

At 304 of the method 300, the lug body 266 may be formed. In some embodiments, the lug body 266 may be cast from a single crystal metallic material, such as a nickel-based superalloy. The lug body 266 may be formed from SC180 in some embodiments. The lug body 266 may also be cast to include a predetermined (primary and secondary) grain orientation for providing the lug 232 with high strength properties along predetermined load paths. This grain orientation may be selected and formed according to the loads applied by the blades 126 on the lugs 232 during rotation of the rotor 121. Instead of a single-crystal material, the lug body 266 may be formed from a high-temperature capable polycrystalline nickel-based super alloy such as Mar-M-247EA equiaxed or Mar-M-247DS directionally solidified. The casting grain size may be optimized to balance low cycle fatigue and damage tolerance lives.

Then, at 306 of the method 300, the lug body 266 may be heat treated or otherwise conditioned. For example, at 306, the lug body 266 may be heat treated via solutioning and/or high-temperature aging processes. In some embodiments, the hub 229 may be heat treated similarly at 306.

Next, at 308 of the method 300, the interface material 268 may be provided on the lug body 266. The interface material 268 may be formed of the same material as the hub member 230 in some embodiments. Both may be formed from Alloy 10 in some embodiments. In other embodiments, the interface material 268 and hub member 230 may be formed from different materials but with material properties that are complimentary. The interface material 268 and the hub member 230 may have characteristics that allow them to be friction welded together. Furthermore, the interface material 268 may have characteristics that contrast with those of the lug body 266, especially in conditions associated with friction welding processes. For example, the interface material 268 may have a yield strength that is lower than that of the material of the lug body 266 at temperatures associated with linear friction welding (e.g., between 1800° F. and 2400° F.). As such, the interface material 268 can plastically deform during the friction welding process, and the lug body 266 can remain plastically undeformed during the friction welding process. Furthermore, the interface material 268 can have a higher ductility than that of the lug body 266 for facilitating friction welding. Moreover, the interface material 268 and hub member 230 may have the same (or complimentary) yield strength, ductility, or other characteristic, thereby allowing a robust friction weld to be formed.

At 308, the interface material 268 may be metallurgically bonded to the lug body 266. In some embodiments, the interface material 268 may be solid-state diffusion bonded (attached in a high temperature environment with high pressure) to the lug body 266 to define the inner radial side 264. This diffusion bonding may cause materials to attach on an atomic level for a robust attachment. The resulting inner radial side 264 may be substantially smooth and planar in some embodiments.

Figure 7:
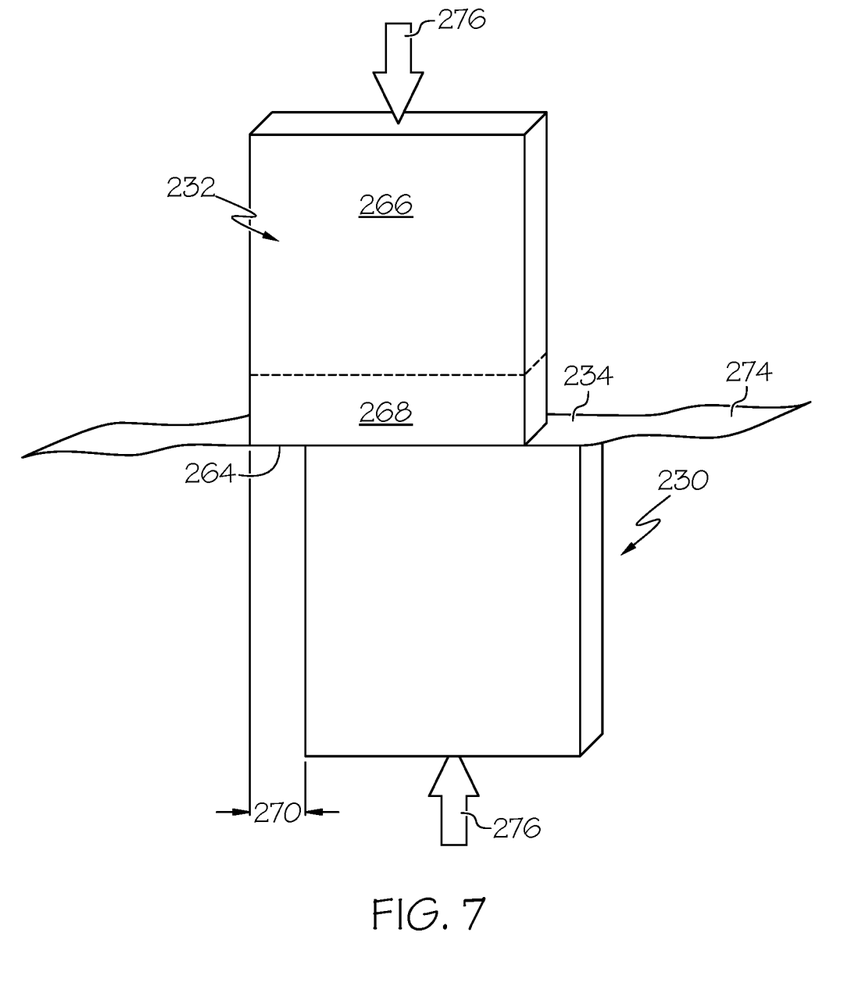
FIG. 7 is a schematic illustration of a linear friction welding process for metallurgical bonding of the lug of FIG. 6 to the hub according to example embodiments.
Figure 8:
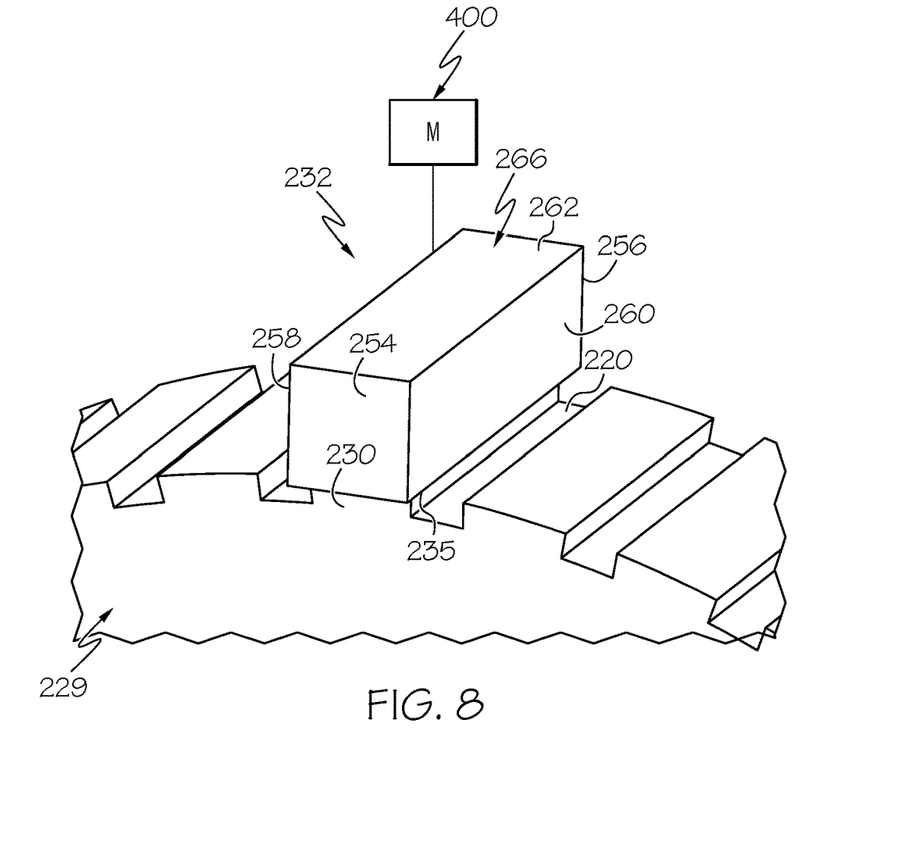
FIG. 8 is a perspective view of the hub and lug of FIG. 6 shown bonded.

Subsequently, at 310 of the method 300, one or more of the lugs 232 (formed at 304-308) may be mated and fixed to the hub 229 (formed at 302). Specifically, the inner radial side 264 of the lugs 232 may be fixed to respective ones of the mate surfaces 234 of the hub members 230. In some embodiments, the inner radial side 264 may be frictionally welded (e.g., linear friction welded) to respective ones of the mate surfaces 234. The linear friction welding process is illustrated schematically in FIG. 7 according to example embodiments. In some embodiments, the interface material 268 may be pressed against the respective mate surface 234, and the lug 232 may be oscillated in a linear direction (e.g., along the axis 228 and/or the axis 103) while the compression load is applied. Frictional heat is generated, and the interface material 268 and the mate surface 234 may begin to plastically deform and flow together, creating a flash material 274. (The lug body 266 may remain plastically undeformed during this process.) Cooling allows the plastically deformed material to fuse, bond, and weld together to create the weld joint 235 and to attach the lug 232 to the hub member 230 (FIG. 8). The amount of compression force (indicated by arrows 276 in FIG. 7) and/or the oscillation distance (indicated by arrows 270) may be selected and tailored for achieving a robust weld joint 235. This may be repeated for attaching the other lugs 232 to the hub member 230. Subsequently, at 312 of the method 300, the hub member 230 and attached lugs 232 may be heat treated or otherwise conditioned.

Figure 9:
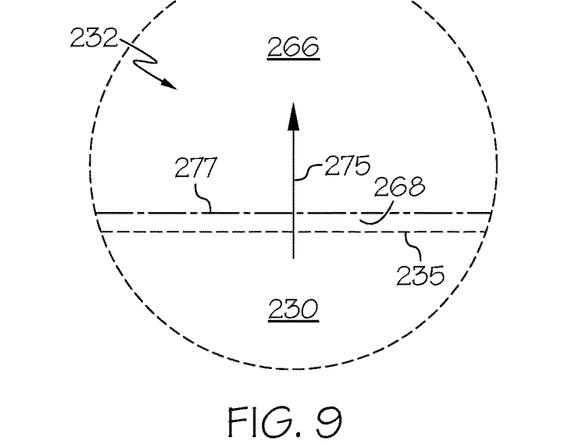
FIG. 9 is a schematic cross section of plural bond interfaces of the outer radial area of the disc assembly.
Figure 10:
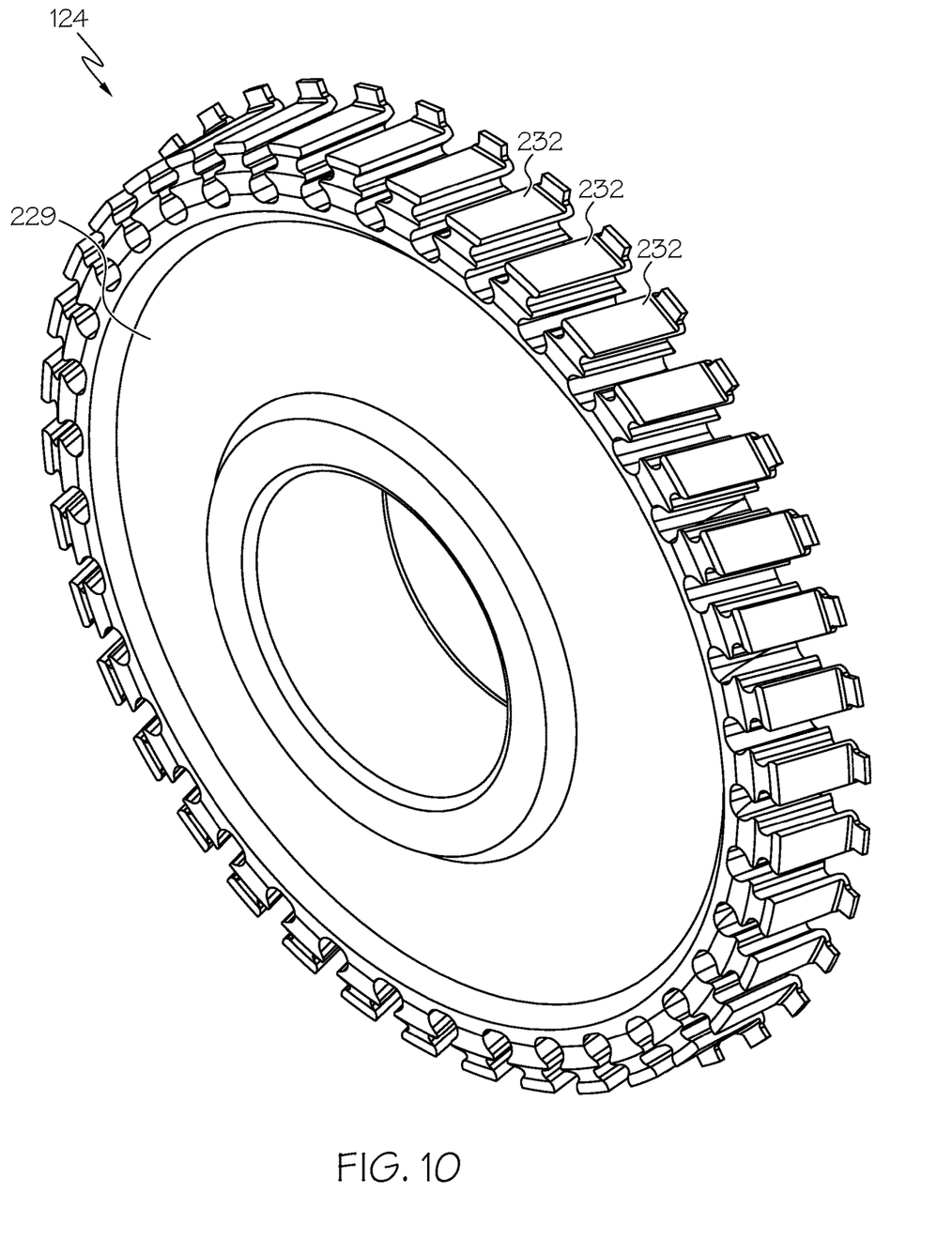
FIG. 10 is a perspective view of the hub and a plurality of lugs shown attached and shaped to define the disc assembly according to the manufacturing method of FIG. 5.

FIG. 9 illustrates the plural bond interfaces between the lug 232 and the hub member 230. The weld joint 235 bonds the material of the hub member 230 and the interface material 268. Also, a bond interface 277 attaches the interface material 268 to the lug body 266. The outward radial direction is indicated in FIG. 9 by arrow 275. (Although the weld joint 235 and bond interface 277 are indicated with straight lines, it will be appreciated that these may not be definitive, planar boundaries. Rather, the bond interface 277 and weld joint 235 include materials from both sides of the boundary and are still recognizable by those having ordinary skill in the art.) As shown, the interface 277 may be disposed outboard radially of the weld joint 235. This is because the interface material 268 is layered on the lug body 266 and is used to attach the lug 232 to the hub member 230 as explained above.

Next, at 314 of the method 300, material may be removed from the lugs 232 and/or the hub member 230. For example, as shown in FIG. 8, fixtures, tooling, and material-removal machinery (generally indicated at 400) may be used to remove any extra flash material 274 (FIG. 7) from the weld joints 235. The slot bottom surfaces 220 may be further shaped. Also, at 314 of the method 300, material may be removed from the lugs 232, thereby shaping the tangential projections 222a, 222b, 226a, 226b. The forward end 254 and/or the aft end 256 of the lug body 266 may also be partly machined to a predetermined shape and profile. Moreover, material may be removed from the outer radial side 262 to define a predetermined shape. The machining of 314 may be repeated for the other lugs 232, resulting in the dual-alloy disc assembly 124 shown, for example, in FIG. 9.

Finishing operations on the disc assembly 124 may be performed at 316 of the method 300. Various finishing operations may be performed, such as oxidation coating, corrosion coating, shot peening, etc. In some embodiments, the disc rim 224 may be targeted specifically for one or more such coatings. The coating(s) may be applied exclusively to the lugs 232 radially outward from (above) the weld joints 235 in some embodiments.

Next, the method 300 may continue at 318, wherein the blades 126 are attached to the disc assembly 124. As discussed above, the inner radial end 130 of the blades 126 may be advanced axially within the spaces 214 and, once in position, the seal plate(s) 160 may be attached to removably attach the blades 126 to the disc assembly 124 as represented in FIGS. 2 and 3. Once the blades 126 are attached, at 320, the turbine wheel 122 may be incorporated in the turbine stage 116 of the gas turbine engine 105.

As mentioned above, the method 300 may be useful for determining, evaluating, tailoring, designing, selecting, and/or choosing characteristics of the weld joints 235. For example, if at 301 of the method 300, the final position for the weld joint 235 is unknown (301 answered negatively), then at 322 a stress analysis may be performed for the projected structures 212 of the disc assembly 124. In some embodiments, computerized tools may be used for finite element analysis of the disc assembly 124 and the weld joints 235. This may also include use of a physical specimen as indicated by the broken line in FIG. 5 leading from 310 to 322. The stress analysis of 322 may be used to produce the loading mapped to the embodiment of FIG. 4. The method 300 may continue at 324, wherein the position of the weld joint 235 may be adjusted, tailored, and selected to extend through an area of lower stress as compared to areas positioned radially inboard and outboard. As mentioned above, the weld joints 235 may be substantially planar and arranged tangent to a circle that is centered on the axis 103. Thus, the radius of this circle may be determined at 324. In some embodiments, the weld joints 235 may be located between the radius of the slot bottom surface 220 and the lower fillet surface 227. Once the position is determined, the method 300 may continue back to 302 in some embodiments.

Accordingly, the disc assembly 124 and the rotor 121 may be highly robust. The disc rim 224 may have high-temperature capability. Furthermore, manufacturing efficiencies are provided by the present disclosure. Also, the present disclosure provides improved opportunity for inspection of the weld integrity between the lugs 232 and the hub 229 and enables repair/replacement of individual attachments/lugs if needed. Likewise, individual blades 126 may be removably attached to the disc assembly 124; therefore, the blades 126 may be conveniently attached, removed, and replaced for added benefit.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of manufacturing a rotor that defines an axis of rotation for a turbomachine, the method comprising:
   providing a lug with a lug body and an interface material disposed on the lug body;
   friction welding the lug to a hub member using the interface material, thereby defining a projected structure for an outer radial area of a disc assembly of the rotor;
   disposing the projected structure proximate another projected structure that projects from the disc assembly, the projected structure and the other projected structure spaced apart in a circumferential direction relative to the axis of rotation to at least partly define a space for a rotor blade;
   removably attaching the rotor blade to the disc assembly within the space; and
   the lug body and the hub member made from different materials.

2. The method of claim 1, wherein providing the lug includes solid-state bonding the interface material to the lug body.

3. The method of claim 2, wherein providing the lug includes diffusion bonding the interface material to the lug body.

4. The method of claim 1, wherein the interface material plastically deforms during the friction welding, and wherein the lug body remains plastically undeformed during the friction welding.

5. The method of claim 1, wherein the interface material is made of the same material as the hub member.

6. The method of claim 1, further comprising shaping at least one of the lug and the hub member after friction welding the lug to the hub member and before removably attaching the rotor blade to further define the space for the rotor blade.

7. The method of claim 6, wherein the projected structure defines a radial direction;
   wherein shaping includes shaping the lug body to include a projection that projects in a tangential direction, the projection being spaced apart at a distance in the radial direction from the hub member.

8. The method of claim 7, wherein shaping includes shaping the projection and the hub member to define at least part of a rounded lobe.

9. The method of claim 8, wherein the lobe includes a slot bottom surface;
   wherein the projection is spaced apart radially from the slot bottom surface; and
   wherein friction welding includes forming a weld joint radially between the slot bottom surface and the projection.

10. The method of claim 1, wherein the lug body comprises a single-crystal material structure; and
    wherein the hub member comprises a poly-crystalline material structure.

11. The method of claim 10, wherein the lug body is made from a first alloy; and
wherein the hub member is made from a second alloy different from the first alloy.

12. The method of claim 1, wherein the lug body is made of a nickel-based super alloy; and
wherein the hub member is made of a powder metal material.

13. The method of claim 1, further comprising determining a radial position of a weld joint for friction welding the lug to the hub member; and
wherein friction welding the lug to the hub member includes forming the weld joint approximately at the determined radial position.

14. The method of claim 13, further comprising performing a stress analysis for the projected structure; and
wherein determining the radial position includes determining the radial position of the weld joint according to the stress analysis.

15. A method of manufacturing a rotor that defines an axis of rotation for a turbomachine, the method comprising:
providing a first lug with a first lug body and a first interface material disposed on the first lug body;
providing a second lug with a second lug body and a second interface material disposed on the second lug body;
friction welding the first lug to a first hub member using the first interface material, thereby defining a first projected structure for an outer radial area of a disc assembly of the rotor, the first projected structure including a first side;
friction welding the second lug to a second hub member of the disc assembly using the second interface material to define a second projected structure for the outer radial area of the disc assembly of the rotor, the second projected structure including a second side that is spaced apart from the first side in a circumferential direction relative to the axis of rotation to at least partly define a space for a rotor blade;
removably attaching the rotor blade to the disc assembly within the space;
the first lug body and the first hub member made from different materials; and
the second lug body and the second hub member made from different materials.

16. The method of claim 15, wherein the first lug body is made of a nickel-based super alloy; and
wherein the first hub member is made of a powder metal material.

17. The method of claim 15, wherein the first interface material is made of the same material as the first hub member.

18. The method of claim 15, further comprising shaping at least one of the first lug and the first hub member after friction welding the first lug to the first hub member and before removably attaching the rotor blade to further define the space for the rotor blade.

\* \* \* \* \*